United States Patent [19]

Middlebrook

[11] 4,456,727

[45] Jun. 26, 1984

[54] PHENOL-FORMALDEHYDE RESINS AS ADDITIVES FOR SOLUTION-POLYMERIZED COPOLYMERS OF CONJUGATED ALKADIENES AND VINYL ARENES

[75] Inventor: Terence C. Middlebrook, Bartlesville, Okla.

[73] Assignee: Phillips Petroleum Company, Bartlesville, Okla.

[21] Appl. No.: 373,773

[22] Filed: Apr. 30, 1982

[51] Int. Cl.$^3$ .............................................. C08L 61/10
[52] U.S. Cl. .................................... 524/511; 524/505; 525/139; 525/901
[58] Field of Search ................. 525/139, 92, 133, 901; 524/474, 484, 511, 505; 526/340

[56] References Cited

U.S. PATENT DOCUMENTS

| | | | |
|---|---|---|---|
| 2,211,048 | 8/1940 | Bitterich | 525/139 |
| 2,708,192 | 5/1955 | Joesting et al. | 525/139 |
| 2,734,039 | 2/1956 | Peterson et al. | 260/19 |
| 3,000,847 | 9/1961 | Graham | 525/139 |
| 3,250,733 | 5/1966 | Giller | 525/139 |
| 3,483,017 | 12/1969 | Korpman | 117/68 |
| 3,631,143 | 12/1971 | Rizzer | 260/38 |
| 3,746,669 | 7/1973 | Dunnom et al. | 525/139 |

FOREIGN PATENT DOCUMENTS 89370 5/1980 Japan .
863309 3/1961 United Kingdom .

OTHER PUBLICATIONS

Hsieh, H. L., "Rubber & Plastics Age" 46, No. 4, 394, 1965; Reprint 'Solution Polymerization Initiated with Alkyllithiums', pp. 1–8.
Robert W. Martin, "The Chemistry of Phenolic Resins", John Wiley & Sons, New York, (1956), pp. 87–136.

Primary Examiner—Theodore E. Pertilla

[57] ABSTRACT

In a process of curing solution-polymerized synthetic rubbers, the improvement effected is the retardation of the cure rate and increasing of time to scorch by the addition of small amounts of a heat-curable phenol-formaldehyde resin. This method of controlling cure rate and scorch time complements other techniques known in the art (e.g., cure accelerators), and can be used to adjust the properties of solution-polymerized rubbers to match those of emulsion-polymerized rubbers.

31 Claims, No Drawings

PHENOL-FORMALDEHYDE RESINS AS ADDITIVES FOR SOLUTION-POLYMERIZED COPOLYMERS OF CONJUGATED ALKADIENES AND VINYL ARENES

This invention relates to rubber compositions, to processes for their preparation, and additives for use therein. In another aspect, this invention relates to processes and additives by which the cure time and scorch time of such compositions can be controlled.

BACKGROUND

Synthetic rubber compositions are widely used in industry. To achieve a degree of standardization in such materials and products, the International Institute of Synthetic Rubber Producers assigns numbers to various commercial grades of styrene-butadiene rubber (SBR), butadiene polymers, etc. The numbering system instituted under the government synthetic rubber program is still used by private industry, although ASTM code numbers and manufacturers' codes or trade names are also used, particularly for newer products. Producers generally prefix an Institute Code number with their distinguishing trade names.

Manufacturers of rubber articles and products have developed standardized production processes and specifications for the basic rubber materials to be used in such processes. The producers of commercial grade rubbers have developed their markets by providing materials which meet the specifications and requirements of these manufacturers. The production of SBR is now generally directed to grades designed for specific uses. One improvement in SBR compounding for specific end uses has been the preparation of carbon black and/or oil-extended masterbatches of regular and oil-extended cold SBR. Because of the large markets available, it is important that producers provide rubber compositions which uniformly meet commercial specifications. For example, additives effective as accelerators and retarders can be used to adjust the curing time of rubbers to commercial specifications.

For example, U.S. Pat. No. 2,734,039 discloses and claims a process for accelerating the curing of butyl rubber by the addition of zinc compounds and chlorosulfonated polythene to accelerate the reaction of dimethylol phenol (a phenol-formaldehyde resin) with the butyl rubber. The *Blue Book* 1981, published by *Rubber World* magazine, discloses at pages 69/70 various retarders for retarding cure and scorch time of rubbers.

SUMMARY OF THE INVENTION

It is an object of this invention to provide a method to retard the curing of certain conjugated alkadiene-vinyl arene copolymer compositions, and thus provide additional means for adjusting the properties of such compositions to the specifications of manufacturers. It is a further object to provide compositions comprising solution-polymerized conjugated alkadiene-vinyl arene copolymers whose cure time and scorch time approximate those of certain emulsion-polymerized commercial grade rubbers, e.g., SBR 1712. It is another object to provide a method for retarding the curing and scorching of certain solution-polymerized conjugated alkadiene-vinyl arene copolymer compositions without adversely affecting the other properties of such compositions to an unacceptable degree. It is another object to provide solution-polymerized conjugated alkadiene-vinyl arene copolymer compositions whose curing and scorch times have been thus adjusted so that they can be used in lieu of, in admixtures with, or layered or laminated with, emulsion-polymerized, commercial grade rubbers such as SBR 1712. It is a still further object to provide carbon black and/or oil-extended masterbatches of solution-polymerized conjugated alkadiene-vinyl arene copolymers with cure and scorch times adjusted so that they can be used with, e.g., SBR 1712 as described above. It is another object to provide an additive for solution-polymerized conjugated alkadiene-vinyl arene copolymer compositions to retard their cure and scorch rates.

I have discovered that certain phenol formaldehyde resins, when added to curable solution-polymerized conjugated alkadiene-vinyl arene copolymer compositions, will retard their cure and increase scorch time, thus matching the properties of emulsion-polymerized commercial grade rubbers such as SBR 1712, without adversely affecting other properties of the composition to an unacceptable degree. Surprisingly, although the resins used in this invention can be used in butyl rubber compositions as a cure accelerator (as disclosed in U.S. Pat. No. 2,734,039), when added to certain solution-polymerized conjugated alkadiene-vinyl arene copolymer compositions in appropriate quantities said resins retard the cure rate and increase scorch time. Thus, such solution-polymerized conjugated alkadiene-vinyl arene copolymer compositions can be prepared to meet the specifications of manufacturers who require emulsion-polymerized compositions resembling, e.g., SBR 1712.

These and other objects and advantages of the invention will be apparent to one skilled in the art from the following detailed description, examples and the appended claims.

DETAILED DESCRIPTION OF THE INVENTION

The phenol-formaldehyde resins useful in this invention are heat-curable resins known as phenol resins or resoles. Such resins can be made from para-hydrocarbylphenols and formaldehyde as indicated in Peterson, et al, U.S. Pat. No. 2,734,039, Feb. 7, 1956, col. 2, and in The Chemistry of Phenolic Resins, by Robert W. Martin, John Wiley and Sons, 1956, pages 87–98 (hereinafter, Martin). Generally, in the first reaction stage, a para-hydrocarbylated 2,6-dimethylol phenol is formed which can be converted to higher molecular weight species by further heating, said species having both methylene bridges and dimethylene oxide (—CH$_2$—O—CH$_2$—) bridges, also called benzyl ether linkages. See Martin, pp. 117–136. Phenols that can be employed for the preparation of the heat-curable phenol-formaldehyde resins used as cure retarders in accordance with this invention are those having hydrocarbyl substituents in the para position to the phenolic OH group where generally the hydrocarbyl substituents have from about 3 to about 16 carbon atoms, such as for example 4-propylphenol, 4-tert-butyl phenol, 4-tert-octyl phenol, 4-nonyl-phenol, 4-dodecyl phenol, 4-benzylphenol, 4-cyclohexylphenol, and the like. Preferably, 4-tert-octyl phenol is employed. Good results were obtained in the present examples with a 4-tert-octylphenol resin, which is commercially available. Oil-soluble heat curable resins can be prepared from phenols with bulky hydrocarbyl para substituents, and can be preferred for use with certain rubber compositions of this invention. The phenol-formaldehyde resin cure retarders used in this invention contain both methylol end groups and dimethylene oxide (—CH$_2$—O—CH$_2$—) bridges, which are both quantitatively expressed as the methylol content. The methylol analysis can be carried out by heating the phenol-formaldehyde resin with phenol, toluene and sulfuric acid catalyst and determining the amount of water formed during the reaction of resin with phenol, the water being distilled off as an azeotrope with toluene, as described in greater detail in the Test Procedure T17-MI-B of Schenectady Chemicals, Inc., Schenectady, N.Y. 12301, issued Mar. 29, 1967. This procedure is summarized in Example V herein.

The conditions of manufacture can be varied to control properties of the resins, including molecular weight and methylol content. The pertinent properties of the preferred resins will be in the following ranges:

|  | Ranges | |
| --- | --- | --- |
|  | Generally Used | Preferred |
| Melting point | 50–80° C. | 55–70° C. |
| Methylol content | 4–15% | 6–12% |
| Acid number | 10–25 | 15–20 |
| Molecular weight (Mn) | 200–1600 | 400–1000 |

Mn, the number average molecular weight, is measured with a Menzies-Wright differential thermometer in an ebullioscopic method using dilute solutions of polymers, as described in the Encyclopedia of Polymer Science and Technology (John Wiley & Sons, 1969), Vol. 10, page 31. Acid number is defined in ASTM D 2849.

The resins with higher melting points and lower methylol content, used as tackifiers in natural and synthetic rubber (e.g., Amberol ®ST-140 C, a resin having a melting point of about 90°–95° C. and a methylol content of about 0.5) are generally not operative in this invention, as shown in Examples III and IV.

Presently preferred is Schenectady Chemicals SP 1044, formerly Amberol ®ST 150 C, a heat curable phenol-formaldehyde resin formerly marketed by Rohm and Haas Co., Philadelphia, PA having a melting point (capillary tube method) of 57°–66° C., an acid number (as defined in ASTM D 2849) of 15, and a methylol content of 7.0–9.5%. The number average molecular weight Mn of this polymer is about 600 to 800.

As will be seen more fully in the examples, the cure retardant resin is used as a minor component in the solution-polymerized conjugated alkadiene-vinyl arene copolymer composition to retard the cure rate, increasing both cure time and time to scorch. The amount added can be significant, as amounts of the resin which retard cure can also degrade properties of the cured rubber including 300% modulus, tensile strength, hysteresis and resilience. While quantities within a range of about 1 to about 5 parts by weight of the resin per 100 parts by weight of copolymer can be used to control cure rate and time to scorch, for most rubber compositions it is preferred to use less than 5 parts per 100 parts by weight of copolymer, since beyond this level other properties can be adversely affected to a degree, which in some applications may be unacceptable. Although the balance between the needed change in cure rate and the standards for such properties will vary, depending upon the types of rubber used and their prospective uses, based on the examples herein it is presently preferred that the resin used in this invention be added in proportions within a range of from about 1.0 to about 3.5 parts by weight per 100 parts by weight of copolymer.

Rubber Compositions

The resins used in this invention can be added to rubber compositions comprising solution-polymerized copolymers of conjugated alkadienes and vinyl arenes to achieve desired effects including the retardation of cure rate and the increase of time to scorch. Generally, these resins can be used to achieve the desired effects in any conjugated alkadiene-vinyl arene copolymer having from 90–50 wt. % bound alkadiene, (for example butadiene) and 10–50 wt. % bound vinyl arene (for example, styrene) which is prepared by polymerization in a non-polar organic solvent employing an organic alkali metal compound, preferably organo-lithium compounds. The alkadiene monomer units generally have from 4 to about 12 carbon atoms and the vinyl arene monomer units generally have from 8 to about 16 carbon atoms. For example, in case of Solprene ®380, the initiator system is a mixture of n-butyllithium and divinylbenzene. The copolymers can be random or block type, and linear or radial in structure. However, the copolymers with which this invention is most useful and effective are generally substantially random. As for molecular weight, the number average molecular weight Mn for suitable copolymers can range from about 60,000 to about 350,000. Solprene ®380, for example, contains a copolymer of Mn=216,000. Vinyl content (addition in 1,2-mode) can range from about 8 to about 40 percent.

The solution-polymerized alkadiene-vinyl arene copolymers to which this invention is applicable are represented by Solprene ®380 in the examples. Solprene ®380 is a mixture of 37.5 parts by weight of an aromatic oil and of 100 parts by weight of a butadiene-styrene copolymer containing about 75 wt. % of bound butadiene and 25 wt. % of bound styrene. In addition, Solprene ®380 is a radially branched copolymer coupled with silicon tetrachloride. (Most Solprene ® rubbers are SiCl$_4$ coupled.) The vinyl content of Solprene ®380 is 30%.

The resins useful in this invention can be employed in similar copolymers having properties comprising alkadiene/vinyl arene content, molecular weight and vinyl content within the ranges indicated above. Excellent results were obtained with this resin, as shown in the examples.

As discussed above, the invention is applicable to oil-extended masterbatches, optionally containing fillers, as well as the rubber compositions alone. Various extender oils can be used to extend or compound the rubber compositions to which this invention is applicable, including naphthenic and aromatic hydrocarbons. Generally the naphthenic and aromatic hydrocarbon extender oils will have a specific gravity in the range of about 0.89 to about 1.05.

The oil to rubber (polymer) weight ratio can be selected over a relatively broad range, but said weight ratio generally is within the range of from about 0.1:1 to about 1:1, preferably from about 0.4:1 to about 0.8:1, and most preferably from about 0.5:1 to about 0.7:1. Very good results were obtained employing a ratio for Solprene ®380, for example, of about 0.56:1. The oils used in Solprene ® masterbatches, for example, or in Solprene® rubber compositions for tires in general, are naphthenic and aromatic hydrocarbon (mineral) oils have a specific gravity of about 0.89 to about 1.05, preferably an aromatic oil having a specific gravity of about 0.98 to about 1.02.

Carbon Black

Carbon blacks employed as fillers in rubber compositions of this invention can be any of the carbon blacks listed in ASTM D1765-76. The weight ratio of carbon black to rubber (polymer only) in such compositions can range from about 0.1:1 to about 1.5:1, preferably about 0.4:1 to about 1.2:1, and most preferably from about 0.6:1 to about 1:1, based on test data. For example, Solprene®380 can be filled with an N-330 type carbon black having a surface area (ASTM D 3037) of about 82 m$^2$/g, an iodine absorption number (ASTM D 1510) of about 82, and a dibutyl phthalat (DBP) absorption number (ASTM D 2414) of about 86–102 Cm$^3$/100 g).

Additives

As is known in the art, rubber compositions can contain numerous additives to achieve various objectives. The following additives are representative of some of those which can be used in rubber compositions to which this invention is applicable:

Vulcanization Activators

Zinc Oxide is a basic-type vulcanization accelerator activator. (Other, less preferred basic-type activators are: CaO, MgO and CdO.)

Stearic Acid is an acid-type vulcanization activator and processing aid. (Other, less preferred acid-type activators are: palmitic acid, oleic acid and lauric acid).

Vulcanizing Agents

Sulfur is a common vulcanizing (crosslinking) agent. Other, less preferred vulcanizing agents include organic peroxides such as for example benzoyl peroxide, dicumyl peroxide, inorganic peroxides such as for example lead peroxide; hexamethylene diamine; and melamine-formaldehyde resins.

Vulcanization Accelerators

Santocure® NS is a vulcanization accelerator which can be used in the rubber compositions to which this invention is applicable. Its chemical name is N-t-butyl-2-benzothiazyl sulfenamide. Other functional benzothiazyl sulfenamides are N-cyclohexyl-2-benzothiazyl sulfenamide, N-isopropyl-2-benzothiazyl sulfenamide, N-oxydiethylene-2-benzothiazyl sulfenamide, and N,N-diisopropyl-2-benzothiazyl sulfenamide. Other, less preferred accelerators are: diphenyl-thiourea, benzothiazyl disulfide, tetramethyl thiuram, dithiocarbamate, and diphenyl guanidine.

Mixing/Compounding

This invention is generally applicable to conventional mixing and compounding processes for rubber compositions, in that time to scorch can be increased. Mixing of the ingredients can be done by any suitable mixing means, such as for example internal mixer and roll mill. Exemplary mixing and drying conditions are disclosed in Example I.

Curing Processes

This invention is applicable to rubber composition curing processes carried out at temperatures in the range from about 100° C. to about 200° C., preferably in the range of from about 140° to about 160° C. for periods of time ranging from about ¼ to about 3 hours, the larger periods of time within the stated range preferably being employed with the lower temperatures.

The following examples will serve to illustrate the invention in detail:

EXAMPLE I

In this example the preparation of two control and of two inventive vulcanized rubber compositions is described. These compositions were prepared according to Recipe I.

| Ingredients (Parts by weight) | Recipe I | | | |
|---|---|---|---|---|
| | Run 1 (Control) | Run 2 (Invention) | Run 3 (Invention) | Run 4 (Control) |
| Solprene® 380[a] | 100.0[k] | 100.0[k] | 100.0[k] | — |
| SBR 1712[b] | — | — | — | 100.0[k] |
| Philrich® 5 Oil[c] | — | 0.56 | 0.84 | — |
| Carbon Black IRB #4[d], | 50.0 | 51.0 | 51.5 | 50.0 |
| Zinc Oxide[e] | 2.18 | 2.23 | 2.25 | 2.18 |
| Sulfur[f] | 1.27 | 1.30 | 1.31 | 1.27 |
| Stearic Acid[g] | 0.73 | 0.74 | 0.75 | 0.73 |
| Santocure® NS[h] | 1.00 | 1.02 | 1.04 | 1.00 |
| Amberol® ST 150C[i] | — | 1.48 | 2.25 | — |

[a] a blend of 100 parts by weight of a random butadiene-styrene copolymer, containing about 25 weight percent of bound styrene and about 75 weight percent bound butadiene, and 37.5 parts by weight of a highly aromatic oil. About 0.5 parts by weight of BHT antioxidant is added. The base polymer is initiated with a multichelic initiator system comprising divinylbenzene and n-butyllithium, added continuously or in increments during early stages of conversion. The copolymer is radially branched by coupling with silicon tetrachloride, has a molecular weight M$_n$ of about 216,000, a vinyl content of about 30%, and an inherent viscosity of 2.06. The blend is marketed by Phillips Petroleum Chemicals NV/SA, 355 Steenweg op Brussels, Overijse, Belgium.
[b] a blend of 100 parts by weight of an emulsion-polymerized butadiene-styrene copolymer, having a bound styrene content of about 23.5 weight percent and about 76.5 weight percent of bound butadiene, and 37.5 parts by weight of a highly aromatic extender oil, marketed by General Tire Company, Akron, Ohio. General description is found in the Vanderbilt Rubber Handbook, published by the R. T. Vanderbilt Company, 1978, p. 55–61. The polymerization is carried out in water containing emulsifier(s) (e.g., sodium stearate, rosin acid soaps) and a peroxy-compound as initiator (e.g., potassium peroxidisulfate, benzoyl peroxide, cumene hydroperoxide). A staining stabilizer is added.
[c] an aromatic rubber extender oil having a viscosity of 170 Seybold Unit Seconds at 210° F. and a specific gravity of 0.9916, marketed by Phillips Petroleum Company, Bartlesville, OK 74004.
[d] Industrial Rubber Black #4, a N-330 type carbon black marketed by Phillips Chemical Company, a subsidiary of Phillips Petroleum Company, Bartlesville, OK 74004, having a surface area (N$_2$ adsorption) of 82 m$^2$/g, a CTAB adsorption of 83 M$^2$/g, a DBP absorption of 86 cm$^3$/100 g, a tint of 107, and an iodine number of 82.
[e] used as a cure activator
[f] used as a vulcanization agent
[g] used as a cure activator and processing aid
[h] N—t-butyl-2-benzothiazyl sulfenamide, a cure accelerator marketed by Harwick Chemical Corporation, Akron, Ohio.
[i] a curable phenol-formaldehyde resin formerly marketed by Rohm and Haas Company, Philadelphia, Pa., having a melting point of 65° C., an acid number of 15, and a methylol content of 8.0%. Amberol ST 150 C is no longer manufactured by Rohm & Haas. It is now manufactured by Schenectady Chemicals, Schenectady, N. Y. under the product designation SP 1044. It is made from p-tert-octylphenol and formaldehyde. The molecular weight -continued Recipe I

| Ingredients (Parts by weight) | Run 1 (Control) | Run 2 (Invention) | Run 3 (Invention) | Run 4 (Control) |
|---|---|---|---|---|

Mn ranges from about 600–800. The melting point ranges from about 57° C. to about 66° C. It has a methylol content of 7.0–9.5 (stemming from terminal methylol end groups as well as hydrolyzable dimethylene oxide bridges).
[k]100 parts contain 72.7 parts by weight (i.e., 72.7 weight %) of copolymer.

Mixing of the ingredients of the rubber compositions of Recipe I was carried out in a "BR" Banbury lab size internal mixer at a speed of about 118 r.p.m. and with cold circulating water. The oil-extended rubber blends, i.e. Solprene ®380 or SBR 1712 plus oil (masterbatches) and zinc oxide were added at the start. Carbon black and other remaining ingredients shown in Recipe I, except sulfur and Santocure ® NS, were added after 0.5 minutes. After about 4 minutes the blends were dumped at 160°–165° C. onto a 6"×12" roll mill and sheeted off after 2 minutes of milling. The sheeted rubber blends were remilled in the "BR" Banbury at about 100°–110° C. for 1–1.5 minutes. Sulfur and Santocure ® NS were added at the start of the remilling in the Banbury mixer. Finally, the rubber blends were remilled on a 6"×12" roll mill at 90° C. and sheeted off after 5 minutes.

Curing of the rubber compositions of Recipe I was accomplished in a compression mold at 145° C. for 35 minutes. Slabs of 6"×6" size were cut for tensile measurements. Strips of unvulcanized rubber were rolled into pellets and cured separately for Mooney, scorch and cure time determinations.

EXAMPLE II

In this example, the most pertinent physical properties of the two inventive and the two control vulcanized rubber compositions described in Example I are presented below in Table I.

TABLE I

|  | Run 1 (Control) | Run 2 (Invention) | Run 3 (Invention) | Run 4 (Control) |
|---|---|---|---|---|
| Scorch Time, 2 Point Rise[a], minutes | 8.7 | 9.3 | 10.3 | 6.4 |
| Time to 90% Cure[a], minutes | 13.0 | 15.9 | 19.5 | 15.0 |
| Mooney Viscosity[b], at 100° C. | 65 | 63 | 65 | 64 |
| 300%-Modulus[c], MPa | 8.8 | 6.5 | 4.3 | 7.9 |
| Tensile Strength[c], MPa | 19.0 | 20.4 | 18.2 | 22.9 |
| Elongation[c], % | 540 | 700 | 850 | 630 |
| Hysteresis, ΔT[d], °C. | 33.5 | 41.3 | >50.0 | 36.8 |
| Permanent Set[e], % | 1.9 | 6.6 | 29.5 | 2.8 |
| Resilience[e], % | 61.4 | 58.1 | 55.3 | 57.7 |
| Shore A Hardness[f] | 63 | 60.5 | 60 | 61 |

[a]determined by means of a Monsanto Rheometer Model TM 100 according to ASTM D1646 at 160° C., employing a rotor of 30.48mm diameter.
[b]determined according to ASTM D3346
[c]determined according to ASTM D412, Method A, employing a CRE-2K tensile tester machine (Precision Scientific Co., Chicago, Illinois), at 78° F.
[d]determined according to ASTM D623, Method A, employing a Goodrich flexometer (Ferry Machine Co.), using a modified specimen size of 0.7" diameter and 1.0" height.
[e]determined according to ASTM D945; same specimen size as for [d].
[f]determined according to ASTM D2240, Shore durometer Type A, Model A2 (Shore Co.).

Discussion of Table I

Data in Table I show that the time to 90% cure of the rubber compositions using Solprene ®380 rubber was considerably increased (about 22% for Run 2 and 50% for Run 3) by the addition of about 1.5 (Run 2) and 2.3 (Run 3) phr of Amberol ®ST 150C phenol-formaldehyde resin and was thereby closely matched to the cure time of SBR 1712. The scorch time of the rubber compositions using Solprene ®380, on the other hand, was only slightly increased (about 7% for Run 2 and 18% for Run 3).

The composition of Run 2 is considered the preferred inventive composition, having higher tensile strength and elongation, acceptable hysteresis and permanent set, plus higher modulus and hardness. The composition of Run 3 may have been inadequately cured at the curing condition of this example, as indicated by excessively high hysteresis and permanent set.

EXAMPLE III

In this example, the cure characteristics of Solprene ®380 rubber compositions containing two related phenol-formaldehyde resins are compared. Control runs 5 and 8 contained no phenol-formaldehyde resin, whereas Control run 6 was carried out with an essentially non-curable phenol-formaldehyde resin having a low methylol content and a relatively high melting point. Inventive run 7 was carried out with the heat curable phenol-formaldehyde resin of high methylol content and substantially lower melting point. Mixing of the ingredients was carried out at conditions identical to those described in Example I, except that the total mixing time in the "BR" Banbury mixer was about 4 to 4.5 minutes. The compositions of the one inventive and the three control rubber compositions are given in Recipe II. Curing conditions are identical to those described in Example I.

Recipe II

| Ingredients (Parts by Weight) | Run 5 (Control) | Run 6 (Control) | Run 7 (Invention) | Run 8 (Control) |
|---|---|---|---|---|
| Solprene ® 380[a] | 100.0[c] | 100.0 | 100.0 | — |
| SBR 1712[a] | — | — | — | 100.0 |
| Carbon Black, IRB #4[a] | 50.0 | 50.0 | 50.0 | 50.0 |
| Zinc Oxide[a] | 2.18 | 2.18 | 2.18 | 2.18 |
| Sulfur[a] | 1.27 | 1.27 | 1.27 | 1.27 |
| Stearic Acid[a] | 0.73 | 0.73 | 0.73 | 0.73 |
| Santocure ® N[a] | 1.00 | 1.00 | 1.00 | 1.00 |
| Amberol ® ST-140C[b] | — | 1.45 | — | — |
| Amberol ® ST-150C[a] | — | — | 1.45 | — |

[a]see Recipe I
[b]a non-curable phenol-formaldehyde resin marketed by Rohm and Haas Company, Philadelphia, Pa, having a melting point of about 95° C., an acid number of 30, and a methylol content of 0.5%.
[c]100 parts contain 77.7 wt. % copolymer.

EXAMPLE IV

Pertinent physical properties of vulcanized rubber compositions of Recipe II are listed in Table II.

TABLE II

|  | Run 5 (Control) | Run 6 (Control) | Run 7 (Invention) | Run 8 (Control) |
|---|---|---|---|---|
| Scorch Time, 2 Point Rise[a], minutes | 7.5 | 6.4 | 8.6 | 5.5 |

TABLE II-continued

| | Run 5 (Control) | Run 6 (Control) | Run 7 (Invention) | Run 8 (Control) |
|---|---|---|---|---|
| Time to 90% Cure[a], minutes | 11.8 | 10.9 | 15.0 | 14.0 |
| Mooney Viscosity[a], at 100° C. | 68 | 69 | 70 | 65 |
| 300%-Modulus[a], MPa | 8.8 | 7.7 | 6.0 | 7.9 |
| Tensile Strength[a], MPa | 20.4 | 20.1 | 21.5 | 23.7 |
| Elongation[a], MPa | 560 | 610 | 760 | 650 |
| Hysteresis, $\Delta T$[a], °C. | 29.8 | 31.4 | 35.9 | 34.0 |
| Permanent Set[a], % | 1.3 | 1.3 | 4.3 | 2.7 |
| Resilience[a], % | 62.1 | 60.4 | 59.6 | 58.2 |
| Shore A Hardness[a] | 61 | 61 | 60 | 59 |

[a]see footnotes to Table I.

Discussion of Table II

Data in Table II clearly show that one phenol-formaldehyde resin, Amberol ST 150C, having a melting point of 65° C., caused cure retardation of Solprene®380, whereas another phenol-formaldehyde resin, Amberol ST 140C, having a melting point of 95° C., an acid number of 30 and a methylol content of 0.5% showed opposite effects.

In comparing Run 5 and 6, one observes that the addition of the non-curable phenol-formaldehyde resin (melting point: ~95° C., methylol content ~0.5%) does not prolong the 90% cure; on the contrary, time to scorch and time to 90% cure are slightly shortened. In comparing run 5 and 7, one observes that the addition of the heat-curable phenol-formaldehyde resin (melting point about 65° C.; methylol content 7-9.5%) significantly increases the time to cure and clearly matches that of an emulsion-polymerized rubber (Control Run 8). Also the scorch time is slightly increased-Run 7 versus Run 5.

EXAMPLE V

In this example the determination of methylol content (% methylol) of phenol-formaldehyde resins in accordance with test Procedure T-17-M1-B of Schenectady Chemicals, Inc., Schenectady, N.Y. 12301 is described. Accuracy and precision are generally better than ±3% of the true methylol content.

The method is based on the reaction of phenols with methylol groups (—CH$_2$OH) in the presence of an acid catalyst, to give one mole of water for each methylol group present in the compound:

The water formed in the reaction is measured by adding toluene and conducting an azeotropic distillation.

100 grams of phenol, 150 ml of toluene and 2 drops of concentrated sulfuric acid are placed in a 1000 ml round bottom flask attached to a water-cooled condenser equipped with a Bidwell-Sterling distilling trap of 5 ml-capacity, and a drying tube. In the "blank" run the solution is refluxed until two successive readings of the water trap, taken at 20 minute intervals, are the same, which requires usually 40–60 minutes.

The solution is cooled and transferred to a second dry flask containing 50±1 gram of the sample. The solution containing the sample is then refluxed for 2 hours. After the first hour, the volume of the water in the trap is recorded at various time intervals. The final volume is read and recorded, and the methylol content is calculated as follows:

% Methylol = [(B-A)(Density of H$_2$O)(172.2)/grams of sample]

where
A = Volume of water from blank,
B = Total volume of water in trap, hence
(A-B) = Volume of water from sample.

Density of water at room temperature is taken from tables.

While this invention has been described in detail for the purpose of illustration, it is not to be construed as limited thereby, but is intended to cover all the changes and modifications within the spirit and scope thereof.

I claim:

1. A process comprising mixing a solution-polymerized copolymer of a conjugated alkadiene and a vinyl arene with a minor amount of a heat curable phenol-formaldehyde resin
   having a melting point in the range of from about 50° C. to about 80° C., in an amount ranging from about 1.0 to about 5.0 parts by weight per hundred parts by weight of said copolymer.

2. A process in accordance with claim 1, wherein said resin has a hydrocarbyl group as a substituent in the para position to the phenolic OH groups and a methylol content in the range of about 4 to about 15 percent.

3. A process in accordance with claim 2, wherein said hydrocarbyl group has in the range of about 3 to about 16 carbon atoms.

4. A process in accordance with claim 2, wherein said hydrocarbyl group is selected from tert-octyl, tert-butyl, nonyl, cyclohexyl or benzyl groups.

5. A process in accordance with claim 1, wherein said resin is a dimethylol monomer, dimer or trimer, or a phenol-formaldehyde polymer having a number average molecular weight of from about 200 to about 1600.

6. A process in accordance with claim 1, wherein said resin has a methylol content of from about 4 to about 15 percent and a melting point in the range from about 55° C. to about 70° C.

7. A process in accordance with claim 1, wherein said resin is added in an amount from about 1.0 to about 3.5 parts by weight per hundred parts by weight of alkadiene-vinyl arene copolymer.

8. A process in accordance with claim 1, wherein said alkadiene has from 4 to about 12 carbon atoms and said vinyl arene has from 8 to about 16 carbon atoms.

9. A process in accordance with claim 8, wherein said copolymer comprises butadiene and styrene monomer units.

10. A process in accordance with claim 1, wherein said copolymer and said resin are mixed with an extender oil and/or at least one filler selected from the group consisting of carbon black, silica, silicates, and mixtures of any two or more thereof, to form a rubber master batch composition.

11. A process in accordance with claim 9 wherein said copolymer contains in the range of about 90 to about 50 weight percent bound butadiene and in the range of about 10 to about 50 weight percent bound styrene, wherein said extender oil is an aromatic extender oil in an amount in the range of about 1 to about 60 parts by weight per hundred parts by weight of butadiene-styrene copolymer.

12. A process in accordance with claim 10, wherein said rubber master batch composition is mixed with one or more additives selected from the group consisting of vulcanization agents, vulcanization activators, processing aids, vulcanization accelerators and vulcanization acceleration activators to form a vulcanizable rubber composition which is subsequently cured at temperatures in the range from about 100° to 200° C. for periods of time ranging from about ¼ to about 3 hours, the longer periods of time within such range being employed with the lower temperatures.

13. A vulcanizable rubber composition comprising:
   (a) a solution-polymerized copolymer of a conjugated alkadiene and a vinyl arene,
   (b) a minor amount of a heat curable phenol-formaldehyde resin having a melting point in the range of from about 50° C. to about 80° C., in an amount ranging from about 1.0 to about 5.0 parts by weight per hundred parts by weight of said copolymer, and
   (c) one or more additives selected from the group consisting of vulcanization agents, vulcanization activators, processing aids, vulcanization accelerators and vulcanization accelerator activators.

14. A composition in accordance with claim 13, further comprising at least one filler selected from the group consisting of carbon black, silica, silicates, and mixtures of any two or more thereof, and an extender oil.

15. A composition in accordance with claim 14, wherein said filler comprises carbon black and said oil is a naphthenic or aromatic oil having a specific gravity selected within a range of about 0.89 to about 1.05.

16. A composition in accordance with claim 13, wherein said copolymer comprises bound alkadiene monomer units having from 4 to about 12 carbon atoms and bound vinyl arene monomer units having from 8 to about 16 carbon atoms.

17. A composition in accordance with claim 13, wherein said copolymer is a butadiene-styrene copolymer containing in the range of about 90 to about 50 weight percent bound butadiene and in the range of about 10 to about 50 weight percent bound styrene.

18. A composition in accordance with claim 13, wherein said resin has a hydrocarbyl group having in the range of about 3 to about 16 carbon atoms as a substituent in the para position to the phenolic OH groups.

19. A composition in accordance with claim 13, wherein said hydrocarbyl group substituent of said phenol-formaldehyde resin is selected from tert-octyl, tert-butyl, nonyl, cyclohexyl or benzyl groups.

20. A composition in accordance with claim 18, wherein said resin comprises monomer and polymer units and has a number average molecular weights in the range from about 200 to about 1600.

21. A composition in accordance with claim 20, wherein said resin has a methylol content in the range of from about 4 to about 15 percent and a melting point in the range of from about 55° to about 70° C.

22. A composition in accordance with claim 13, wherein said resin is added in an amount within the range of from about 1.0 to about 3.5 parts by weight per 100 parts by weight of said copolymer.

23. A process in accordance with claim 7, wherein said resin is added in an amount within the range of from about 1.0 to about 2.3 parts by weight per 100 parts by weight of said copolymer.

24. A process in accordance with claim 1 wherein said copolymer is prepared by polymerization in a non-polar organic solvent employing an organic alkali metal compound.

25. A composition in accordance with claim 13 wherein said copolymer is prepared by polymerization in a non-polar organic solvent employing an organic alkali metal compound.

26. A vulcanizable rubber composition comprising an admixture of:
   (a) a solution-polymerized copolymer of a conjugated alkadiene and a vinyl arene, and
   (b) a minor amount of a heat curable phenol-formaldehyde resin, having a melting point in the range of from about 50° C. to about 80° C., in an amount ranging from about 1.0 to about 5.0 parts by weight per hundred parts by weight of said copolymer, and
   (c) an emulsion-polymerized rubber.

27. Cured rubber articles of manufacture comprising emulsion-polymerized rubbers in admixture with or laminated with compositions prepared according to claim 1.

28. Cured rubber articles of manufacture comprising emulsion-polymerized rubbers in admixture with or laminated with compositions according to claim 13.

29. A process of retarding the cure rate of a curable rubber composition comprising a solution-polymerized copolymer of a conjugated alkadiene and a vinyl arene and at least one curing additive, said process comprising incorporating a minor amount of a heat curable phenol-formaldehyde resin into said composition.

30. A process of adjusting the cure rate of a curable composition comprising a solution-polymerized copolymer of a conjugated alkadiene and a vinyl arene and at least one curing additive to conform approximately to the cure rate of an emulsion-polymerized rubber composition, which process comprises incorporating a minor amount of a heat-curable phenol-formaldehyde resin into said solution-polymerized composition.

31. A process wherein a solution-polymerized copolymer of a conjugated alkadiene and a vinyl arene is
   (a) mixed with a heat curable phenol-formaldehyde resin having a melting point in the range of from about 50° C. to about 80° C., in an amount ranging from about 1.0 to about 5.0 parts by weight per hundred parts by weight of said copolymer which is effective to retard the cure rate of said copolymer,
   (b) said copolymer and said resin are mixed with an extender oil and/or at least one filler to form a rubber master batch composition, and
   (c) said rubber master batch composition is mixed with at least one curing additive selected from the group consisting of vulcanization agents, vulcanization activators, processing aids, vulcanization accelerators and vulcanization accelerator activators to produce a vulcanizable rubber composition.

* * * * *

UNITED STATES PATENT AND TRADEMARK OFFICE
CERTIFICATE OF CORRECTION

PATENT NO. : 4,456,727
DATED : June 26, 1984
INVENTOR(S) : Terence C. Middlebrook It is certified that error appears in the above-identified patent and that said Letters Patent is hereby corrected as shown below:

Claim 7, line 2 , after "amount" insert --- ranging ---.

Signed and Sealed this

Fifth Day of February 1985

[SEAL]

Attest:

DONALD J. QUIGG

Attesting Officer     Acting Commissioner of Patents and Trademarks